United States Patent
Acharya et al.

(10) Patent No.: US 10,172,011 B2
(45) Date of Patent: Jan. 1, 2019

(54) SYSTEM AND METHOD FOR CONTROL CHANNEL DETERMINATION AND DETECTION IN AN OPPORTUNISTIC WIRELESS NETWORK ENVIRONMENT

(71) Applicant: CISCO TECHNOLOGY, INC., San Jose, CA (US)

(72) Inventors: Shwetang Sureshkumar Acharya, Bangalore (IN); Raghavendra Kankanhalli Sudheendra, Bangalore (IN); Nalini Sankaranarayanan, Bangalore (IN); Rajaguru Veluchamy, Chennai (IN); Srinath Gundavelli, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/367,051

(22) Filed: Dec. 1, 2016

(65) Prior Publication Data
US 2018/0160312 A1    Jun. 7, 2018

(51) Int. Cl.
*H04W 16/14* (2009.01)
*H04W 48/16* (2009.01)

(52) U.S. Cl.
CPC .......... *H04W 16/14* (2013.01); *H04W 48/16* (2013.01)

(58) Field of Classification Search
CPC . H04W 16/14; H04W 72/0453; H04W 48/16; H04W 4/00; H04W 72/04; H04W 24/02; H04W 4/02; H04W 52/383; H04W 72/0473; H04W 72/085; H04W 88/10; H04W 72/0493
See application file for complete search history.

(56) References Cited

U.S. PATENT DOCUMENTS

| | | |
|---|---|---|
| 9,049,686 B2 | 6/2015 | Kim et al. |
| 9,220,119 B2 | 12/2015 | Kim et al. |
| 2011/0090890 A1* | 4/2011 | Seok ............... H04W 48/16 370/338 |
| 2011/0268095 A1* | 11/2011 | Kim ................. H04W 16/14 370/338 |

(Continued)

OTHER PUBLICATIONS

Cognitive Radio Policy and Regulation: Techno-Economic Studies to Facilitate Dynamic Spectrum Access, edited by Medeisis et al., published in 2014, p. 179-180.*

(Continued)

*Primary Examiner* — Daniel Lai
(74) *Attorney, Agent, or Firm* — Patterson + Sheridan, LLP

(57) ABSTRACT

An example apparatus for control channel determination and detection in an opportunistic wireless network environment is provided and includes a processor; and a memory in communication with the processor. The processor configured is to send, by a first device, a request for a whitespace map, the whitespace map including a list of whitespace frequency channels available for use within a particular geographical area. The processor is further configured to receive the whitespace map by the first device, and determine, by the first device, a control channel map from the whitespace map using a probability algorithm. The control channel map is a subset of the white space map and includes a list of control channel frequencies.

19 Claims, 6 Drawing Sheets

(56) References Cited

U.S. PATENT DOCUMENTS

| | | | |
|---|---|---|---|
| 2013/0078924 A1* | 3/2013 | Choudhury | H04W 16/14 455/62 |
| 2013/0300941 A1 | 11/2013 | Kafle et al. | |
| 2014/0105134 A1* | 4/2014 | Buddhikot | H04W 16/14 370/329 |
| 2015/0063332 A1 | 3/2015 | Lee et al. | |
| 2015/0223074 A1* | 8/2015 | Prytz | H04W 16/14 370/235 |
| 2015/0271309 A1* | 9/2015 | Ames | H04W 4/02 455/456.1 |
| 2015/0341930 A1* | 11/2015 | Fitch | H04W 16/14 455/514 |

OTHER PUBLICATIONS

U.S. Appl. No. 15/371,016, filed Jan. 17, 2017, entitled "System and Method for Discovery and Acquisition of a Control Channel Using Guard Bands," Inventor(s) Shwetang Sureshkumar Acharya, et al.
Flores, Adriana B., et al., "IEEE 802.11af: A Standard for TV White Space Spectrum Sharing," IEEE Communications Magazine, Oct. 2013; 9 pages.

* cited by examiner

SYSTEM AND METHOD FOR CONTROL CHANNEL DETERMINATION AND DETECTION IN AN OPPORTUNISTIC WIRELESS NETWORK ENVIRONMENT

TECHNICAL FIELD

This disclosure relates in general to the field of communications and, more particularly, to a system and method for control channel determination and detection in an opportunistic wireless network environment.

BACKGROUND

Radio spectrum (3 kHz-300 GHz) is a finite and scarce resource. Most of today's radio systems require rigorous protection against interference from other radio devices. Such protection is often provided by exclusive use of an assigned radio spectrum. Most of the radio spectrum is therefore licensed to traditional communication systems and services. However, with this approach spectrum resources are sometimes wasted for various reasons. For example, any economic failure of licensed radio services and systems may lead to unused spectrum. As another example, public safety and military radio systems often require spectrum use only occasionally. In still another example, technological progress in communication systems has resulted in the improvement in spectral efficiency. As a result, certain frequency bands, called "white space" or "whitespace" licensed to operators may be shared by secondary users. Whitespace refers to portions of a licensed radio spectrum that licensees do not use all of the time or in all geographic locations. This whitespace spectrum may be dynamically accessed by registered and/or valid secondary users in order to share the spectrum when it is not used by the licensee.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example apparatus for control channel determination and detection in an opportunistic wireless network environment is provided and includes a processor; and a memory in communication with the processor. The processor configured is to send, by a first device, a request for a whitespace map, the whitespace map including a list of whitespace frequency channels available for use within a particular geographical area. The processor is further configured to receive the whitespace map by the first device, and determine, by the first device, a control channel map from the whitespace map using a probability algorithm. The control channel map is a subset of the white space map and includes a list of potential control channel frequencies.

Example Embodiments

Figure 1:
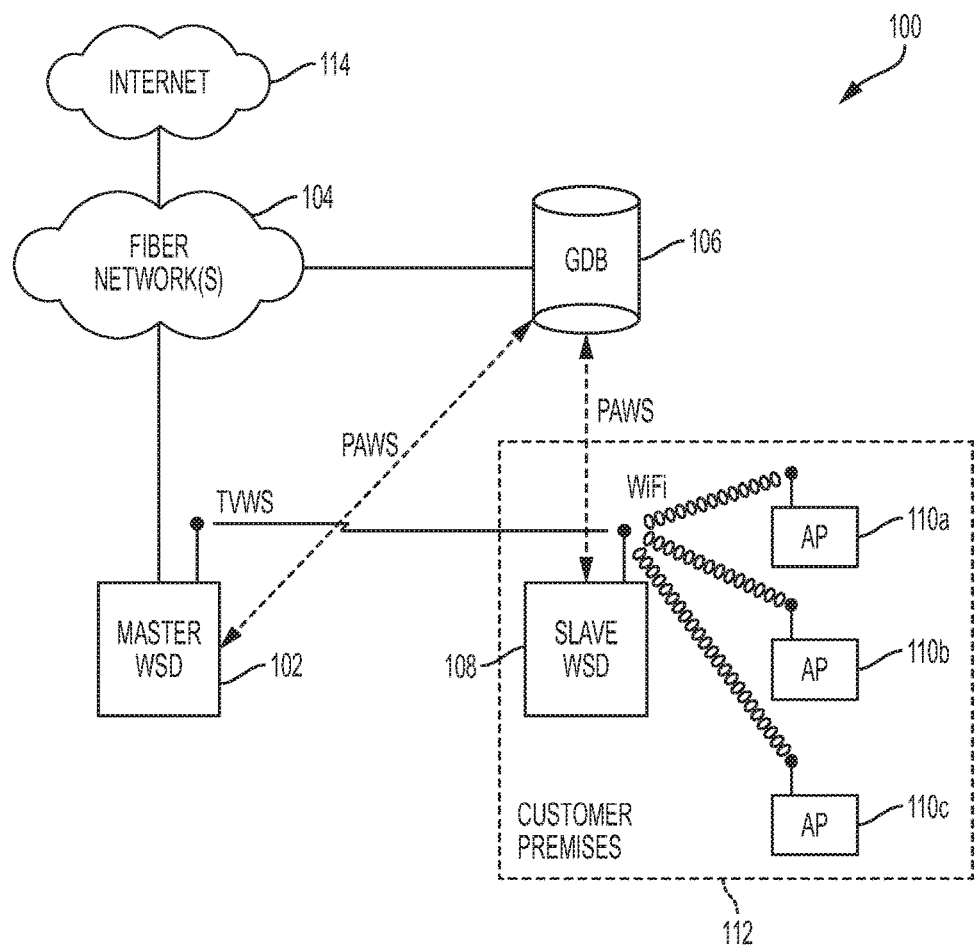
FIG. 1 is a simplified block diagram illustrating a communication system for control channel determination and detection in an opportunistic wireless network environment in accordance with one example embodiment.

Referring now to FIG. 1, FIG. 1 is a simplified block diagram illustrating a communication system 100 for control channel determination and detection in an opportunistic wireless network environment in accordance with one example embodiment. FIG. 1 illustrates a communication network 100 (indicated generally by an arrow) facilitating communication between user devices in an opportunistic wireless network environment and the Internet 114. Communication system 100 includes a master whitespace device (WSD), one or more fiber network(s) 104, a geolocation database (GDB) 106, a slave whitespace device 108, a first access point 110a, a second access point 110b, and a third access point 110c. In the particular embodiment illustrated in FIG. 1, slave WSD 108, first access point 110a, second access point 110b, and third access point 110c are located at a customer premises 112.

Recently, there has been a great deal of interest from the communications industry in the use of UHF digital terrestrial TV (DTT) frequencies by so-called cognitive radios or white-space devices (WSDs). Television whitespaces (TVWS) is a block of UHF/VHF frequencies which was originally allocated for analog terrestrial broadcasting services (such as TV, wireless microphones, news gathering, etc.) and may differ according to the particular geographic area of operation. This block is currently being freed up in chunks due to widespread digitization of TV transmissions. TVWS access is a promising approach to address spectrum scarcity problems due to a large amount of TVWS spectrum resources and better propagation properties of TVWS (TV White Space) channels. A geo location database (GDB) is a database that holds available white space frequencies (like TVWS) in a time and space domain such that a particular geographic region is identified as being allocated particular whitespace frequencies at particular times within the database.

A whitespace device (WSD) is a communication device designed to operate in WS frequencies (e.g., UHF/VHF band). A master WSD serves and controls one or more slave WSDs and has a permanent network connection to the GDB such as a fiber internet connection. A slave WSD serves the purpose of connecting end-user client devices to the network and may use any traditional end-user access technology such as Ethernet/WiFi to accomplish this purpose. A whitespace map (WSM) is a list of available frequencies in the RF spectrum that may be used within a particular geographical area. The WSM is maintained within the GDB and is provided to a requesting end station as a response to a request from the requesting end station. The requesting end station may be a master WSD or a slave WSD. The Procedure to Access Whitespaces (PAWS) protocol is a protocol which defines a set of query-response message structures used between the requesting WSD and the GDB as specified in RFC 7545 of the Internet Engineering Task Force (IETF). A control channel is a frequency on which the master WSD will beacon so that slave WSDs can lock onto this control channel and negotiate further operations and configuration parameters with the master WSD.

The Institute of Electrical and Electronics Engineers (IEEE) formed the IEEE 802.22 Working Group to develop protocols for an interoperable air interface for use in spectrums allocated to TV broadcast service and to provide wireless services such as broadband access a point-to-multipoint wireless regional area network (WRAN). IEEE 802.22 specifies that a network should operate in a point-to-multipoint basis (P2MP). A system should be formed by base stations (BSs), such as master WSDs, and customer premise equipment (CPE) such as slave WSDs or access points. The CPEs are attached to a base station via wireless links in a specified frequency range and each base station controls the medium access for all CPEs attached to it.

One of the challenges of WS access is to design efficient medium access control (MAC) layer protocols. A cognitive MAC protocol is required to not only protect the primary users (e.g., TV Stations, Naval Radar and wireless microphones) but also to deal with spatial-temporal variation of WS. Because of these requirements, a client device can't presuppose what control channel will be used for the client device to join the network.

The MAC protocol does not presuppose any pre-assigned control channel where a slave WSD is able to connect the master WSD given the time-varying and unpredictable nature of channel occupancy. Hence, an initial task a slave WSD must perform in attempting to join a network is to scan a set of channels within the TVWS to detect control channels transmitted by the master WSD. The TVWS frequency band is typically very large, for example 470 MHz-790 MHz is allocated in the United Kingdom (UK). Conventionally, a slave WSD may have to scan all of the frequency band in order to connect with the master WSD and join the network. If the master WSD is also able to operate in the industrial, scientific, and medical radio band (ISM) band, the slave WSD has to search in that band also. This may make it even more time consuming for the slave WSD to join the network. 802.22 allows for WSDs to operate in entire TV band. i.e., 54 MHz-860 MHz which may take even longer time for a slave WSD to join the network.

WSDs are typically classified into two categories: fixed devices and personal/portable devices. Fixed devices are required to register with a database and determine their geographic locations through incorporated geo-location capability and obtain TVWS availability information through database access (e.g., by accessing a GDB). Personal/portable devices are further classified into three types: Mode 1 (client mode), Mode 2 (independent mode) and sensing-only devices. Portable devices operating in Mode 1 obtain the list of available channels from a fixed device or a portable device operating in Mode 2, and Mode 2 portable devices determine available channels through geo-location database access. Sensing-only portable devices obtain availability information merely through spectrum sensing. A particular master WSD may serve a number of different client types including a personal/portable client like cellular radio and a fixed client such as an access point (AP).

Referring again to FIG. 1, master WSD 102 and GDB 106 are each in communication with fiber network(s) 104 via one or more fiber network connections, and fiber network(s) 104 is in further communication with the Internet 114. Master WSD 102 is in communication with slave WSD 108 via a TVWS wireless connection. Slave WSD 108 is in wireless communication with each of first AP 110a, second AP 110b, and third AP 110c via a network connection such as Ethernet or WiFi. Each of slave WSD 108, first AP 110a, second AP 110b, and third AP 110c may be in further communication with one or more end user client devices (not shown) located at the customer premises 112. In accordance with one or more embodiments, master WSD 102, GDB 106, and slave WSD 108 may each use a Procedure to Access Whitespaces (PAWS) protocol to communicate with one another. In accordance with various embodiments, one or more of first AP 110a, second AP 110b, and third AP 110c are provided with access to the Internet 114 via the slave WSD 108, master WSD 102, and fiber network(s) 104. For example, data transmitted by first AP 110a to slave WSD 108 will be transmitted to master WSD 102 using TVWS. Master 102 will then transmit the data to the Internet 114 via fiber network(s) 104. Similarly, data from a source in communication with the Internet 114 is transmitted to master WSD 102 via fiber network(s) 104. Master WSD 102 transmits this data to slave WSD 108 using available WS. Slave WSD 108 then transmits the data to first AP 110a.

Various embodiments described herein provide for a mechanism by which master WSD 102 independently creates a control-channel map from a whitespace map it receives from GDB 106. In particular embodiments, master WSD 102 uses a probability algorithm to determine the control-channel map from the whitespace map. Other embodiments further provide for master WSD 102 to notify GDB 106 of the created control-channel using a protocol message extension. In particular embodiments, the protocol message extension is a Boolean-bit in a PAWS protocol message. In various embodiments, slave WSD 108 can use the message extension to quickly acquire the control channel information from GDB 106 either directly or indirectly.

In one embodiment of a mechanism by which master WSD 102 creates a control-channel map, it is assumed that master WSD 102 has connectivity (e.g., via the Internet) to GDB 106, and slave WSD 108 has direct and/or indirect access to GDB 106. In at least one embodiment, a PAWS protocol deployment scenario is used. Master WSD 102 sends a request for an operational whitespace map (WSM) to GDB 106. In a particular embodiment, master WSD 102 sends the request for the operational WSM upon boot-up. Master WSD 102 then receives a response from GDB 106 including the operational WSM. Master WSD 102 independently derives a control channel map from the operational WSM using a probability algorithm as will be further described herein. In one or more embodiments, master WSD 102 creates the control-channel map based upon: (1) the most frequently offered channels in the WSM at a given interval; and (2) the transmit power allowed for each frequency in the WSM. In particular embodiments, master WSD 102 may also take into account the transmit power for the channels offered. Once master WSD 102 determines the control channel map, master WSD 102 notifies GDB 106 of the newly selected control channel. In a particular embodiment, the control channel map may be exported to slave WSDs in an out of band manner for rapid deployment scenarios.

Once GDB 106 is notified of the control channel, slave WSD 108 is notified with the control channel either directly by querying GDB 106 or indirectly. In particular embodiments, slave WSD 106 is loaded with the control channel map by a network administrator via an out-of-band mechanism such as through a USB connection or via a software application using a tablet. If slave WSD 108 obtains the control channel being beaconed by master WSD 102 from GDB 106, slave WSD 108 establishes a connection with master WSD 102. In the absence of GDB communication, Slave WSD 108 starts scanning the range of frequencies identified within the control channel map to try to detect the control channel that master WSD 102 is beaconing. Any further updated control channel maps can then be directly exchanged between master WSD 102 and slave WSD 108. Slave WSD 108 may store the control channel map within storage (e.g. RAM/ROM/EEPROM/NVRAM) and read the control channel map out of storage for instances in which there is a loss of communication with master WSD 102 or a power outage.

Turning to the infrastructure of communication system 100, the network topology can include any number of whitespace devices, customer premises equipment, servers, switches (including distributed virtual switches), routers, and other inter-connected nodes. A node may be any electronic device, computer, printer, hard disk drive, client, server, peer, service, application, or other object capable of sending, receiving, amplifying, splitting, or forwarding signals over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Fiber network(s) 104 offer a communicative interface between network elements of communication system 100, and may include or be in communication with any local area network (LAN), wireless local area network (WLAN), metropolitan area network (MAN), Intranet, Internet, Extranet, wide area network (WAN), virtual private network (VPN), or any other appropriate architecture or system that facilitates communications in a network environment. Communication system 100 may implement any suitable communication protocol for transmitting and receiving data packets within communication system 100. The architecture of the present disclosure may also operate in conjunction with any suitable protocol, where appropriate and based on particular needs. In addition, gateways, routers, switches, and any other suitable nodes (physical or virtual) may be used to facilitate electronic communication between various nodes in the network.

In some embodiments, a communication link may represent any electronic link supporting a network environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), coaxial fiber, telephone lines, T1 lines, T3 lines, wireless, satellite, fiber optics, cable, Ethernet, etc. or any combination thereof) and/or through any additional networks such as a wide area networks (e.g., the Internet).

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 100. It should be understood that communication system 100 shown in FIG. 1 is simplified for ease of illustration.

Figure 2:
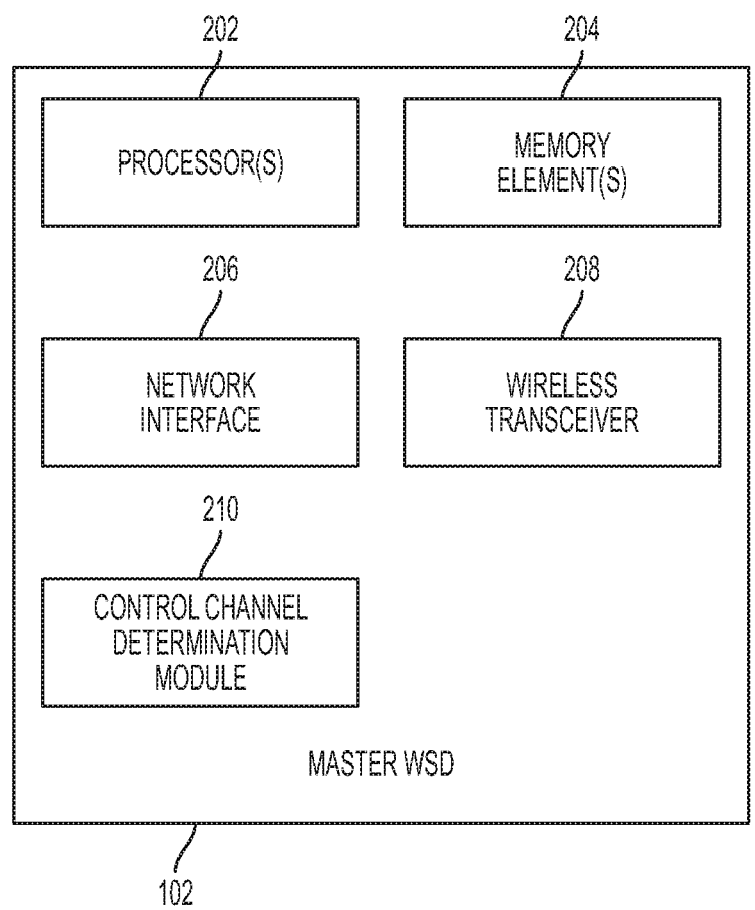
FIG. 2 illustrates a simplified block diagram of a master WSD of FIG. 1 according to one embodiment.

Referring now to FIG. 2, FIG. 2 illustrates a simplified block diagram of master WSD 102 of FIG. 1 according to one embodiment. Master WSD 102 includes one or more processor(s) 202, one or more memory elements 204, a network interface 206, a wireless transceiver 208, and a control channel determination module 210. Processor(s) 202 is configured to execute various tasks of master WSD 102 as described herein and memory element(s) 204 is configured to store data associated with master WSD 102 such as a WSM received from GDB 106 and a control channel map calculated by master WSD 102. Network interface 206 is configured to interface master WSD 102 with one or more of network elements and or networks such as fiber network(s) 104. Wireless transceiver 208 is configured to allow master WSD 102 to communicate wirelessly with slave WSD 108 using a wireless communication protocol such as TVWS. Control channel determination module 210 is configured to determine a control channel map based upon a WSM received from GDB 106 as further described herein.

In one implementation, master WSD 102 is a network element that includes software to achieve (or to foster) the control channel determination and other operations of the master WSD 102 as outlined herein in this Specification. Note that in one example, each of these elements can have an internal structure (e.g., a processor, a memory element, etc.) to facilitate some of the operations described herein. In other embodiments, these control channel determination operations may be executed externally to this elements, or included in some other network element to achieve this intended functionality. Alternatively, master WSD 102 may include this software (or reciprocating software) that can coordinate with other network elements in order to achieve the operations, as outlined herein. In still other embodiments, one or several devices may include any suitable algorithms, hardware, software, components, modules, interfaces, or objects that facilitate the operations thereof.

Figure 3:
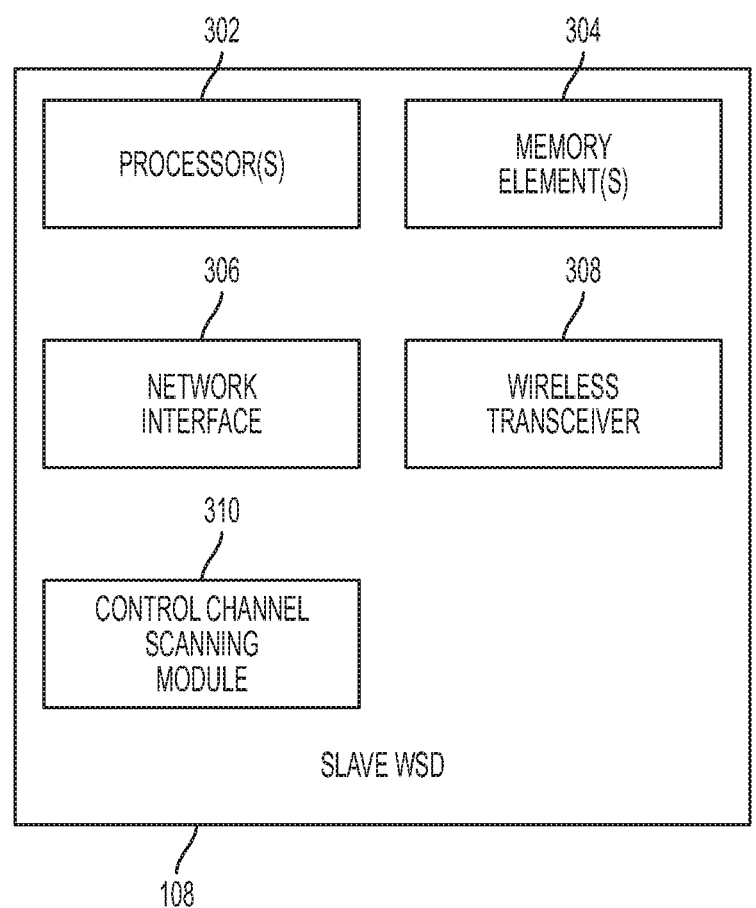
FIG. 3 illustrates a simplified block diagram of a slave WSD of FIG. 1 according to one embodiment.

Referring now to FIG. 3, FIG. 3 illustrates a simplified block diagram of slave WSD 108 of FIG. 1 according to one embodiment. Slave WSD 108 includes one or more processor(s) 302, one or more memory elements 304, a network interface 306, a wireless transceiver 308, and a control channel scanning module 310. Processor(s) 302 is configured to execute various tasks of salve WSD 108 as described herein and memory element(s) 304 is configured to store data associated with slave WSD 108 such as a control channel map calculated by master WSD 102. Network interface 306 is configured to interface slave WSD 108 with one or more of network elements and or networks such as an Ethernet network. Wireless transceiver 308 is configured to allow slave WSD 108 to communicate wirelessly with one or more network elements such as master WSD 102 using a wireless communication protocol such as 802.11af or 802.22 to operate in TVWS. Control channel scanning module 210 is configured to allow slave WSD 108 to scan each of the whitespace frequencies within the control channel map to detect a control channel beacon transmitted by master WSD 102 as further described herein.

In one implementation, slave WSD 108 is a network element that includes software to achieve (or to foster) the control channel scanning and other operations of the slave WSD 108 as outlined herein in this Specification. Note that in one example, each of these elements can have an internal structure (e.g., a processor, a memory element, etc.) to facilitate some of the operations described herein. In other embodiments, these control channel scanning operations may be executed externally to this elements, or included in some other network element to achieve this intended functionality. Alternatively, slave WSD 108 may include this software (or reciprocating software) that can coordinate with other network elements in order to achieve the operations, as outlined herein. In still other embodiments, one or several devices may include any suitable algorithms, hardware, software, components, modules, interfaces, or objects that facilitate the operations thereof.

Figure 4:
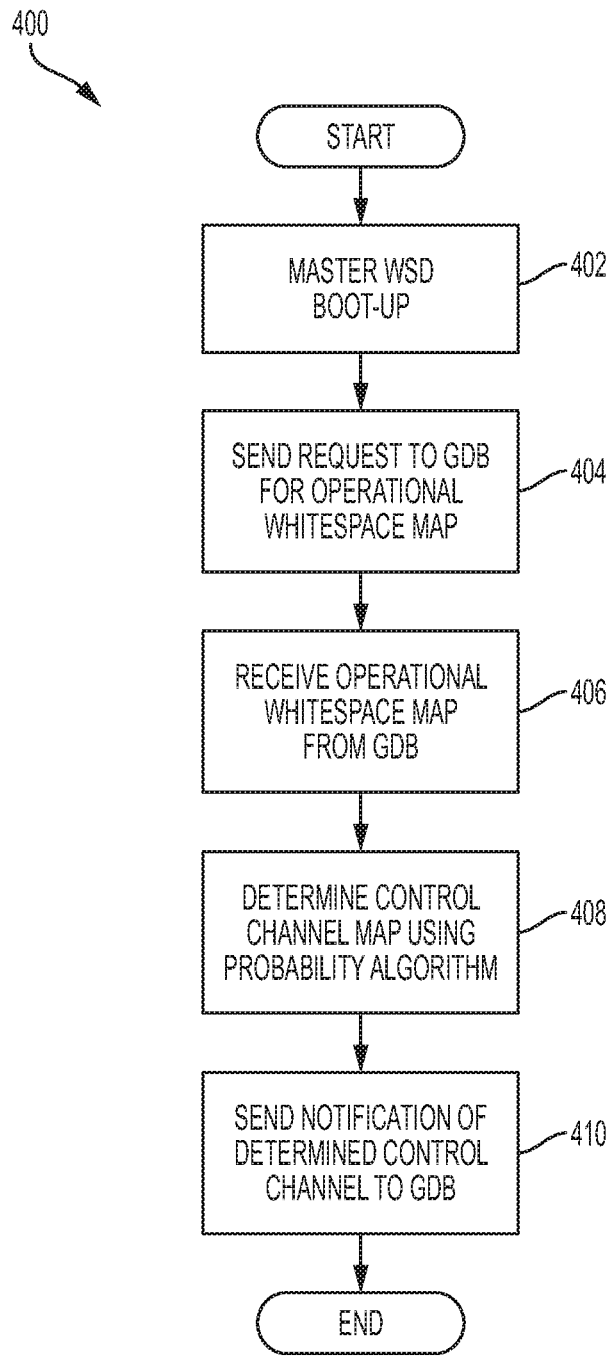
FIG. 4 is a simplified flow diagram illustrating example operations that may be associated with embodiments of the communication system.

Referring now to FIG. 4, FIG. 4 is a simplified flow diagram illustrating example operations 400 that may be associated with embodiments of communication system 100. In 402, master WSD 102 initiates a boot-up procedure. In 404, master WSD 102 sends a request for an operational whitespace map (WSM) to GDB 106. In 406, master WSD 102 receives a response from GDB 106 including the operational whitespace map (WSM). The operational whitespace map includes a list of whitespace frequency channels available for use within a particular geographical area. In 408, master WSD 102 determines a control channel map from the received operational whitespace map (WSM) using a probability algorithm. in one or more embodiments, the probability algorithm used in the determination of the control channel map depends upon: (1) the most frequently offered channels in the WSM at a given interval requested by master WSD 102; and (2) the transmit power allowed for each frequency in the received whitespace map (WSM). In particular embodiments, the given interval is determined by master WSD 102 and includes frequency in "N" number of whitespace map samples within a predetermined interval. The determination of the control channel map may also take into consideration the transmit power restrictions for the channels offered. For example, a probability of a particular frequency offered in all whitespace maps may be greater but if the associated power is less than a particular minimum power level, $P_{min}$, it is possible that master WSD 102 may not be able to service a client residing at an edge of its serving region. If master WSD 102 determines that an offered channel power is less than $P_{min}$ most of the time then master WSD 102 may assign a lower rank to that channel.

A probability algorithm for control channel map determination by master WSD 102 in accordance with at least one embodiment is as follows:

1. Let A={$a_1$, $a_2$, ... $a_n$} is the total number of available channels in a given whitespace map (WSM).
2. N=number of whitespace maps (WSMs) received from GDB 106 for the control channel map during a predetermined sample interval.
3. $X_i$={$a_1$, $a_2$, ... $a_m$} is a number of channels received in the WSM from GDB 106 in the ith attempt (m<=n and i=1 to N)
4. $Z_{a1}$=total number of times the channel a1 appears in the received N WSM.
5. $P(a_1)$=$Z_{a1}$/N=Probability value of channel $a_1$ presence in whitespace maps for N attempts.
6. G={set of all the channels which master WSD 102 prepares for slave WSD 108 for scanning to join network|X belongs to G}. Master WSD 102 calculates the total probability for each of the received channels in the whitespace map and prepares the control channel map as a list of potential control channel frequencies arranged in descending order of probability value.

In an example probability calculation, if a particular channel appeared in 7 out of 10 whitespace map samples received from GDB 106, and power offered is more than $P_{min}$ in 4 of 10 whitespace maps, then the total probability for the particular channel is 7/10×4/10=0.28.

In 410, master WSD 102 sends a notification of the determined control channel to GDB 106 and the operations end. In a particular embodiment, WSD 102 sends a selected list of frequencies for its usage to GDB 106 with one of the frequencies marked as a control channel (is_CC=true). In accordance with various embodiments, the determined control channel can then be provided to and/or exported to slave WSD 108 either by slave WSD 108 directly querying GDB 106, and/or indirectly such as by a network administrator loading the control channel map by an out-of-band (OOB) mechanism such as through a device (e.g. tablet, phone, or external storage) or software application.

In at least one embodiment, master WSD 102 sends a notification message to GDB 106 including an indication for each channel within the whitespace map indicative of whether the channel will be a control channel for master WSD 102. In one or more embodiments, each selected frequency is indicated within the notification message by setting a Boolean flags for each channel indicative of whether the channel will be a control channel. In particular embodiments, the Boolean flag is indicated within a "spectra (profile:list)" field of a "Spectrum_Use_Notify" message using the Procedure to Access Whitespaces (PAWS) protocol that is sent from master WSD 102 to GDB 106. An example format of the Boolean flag within the spectra (profile:list)" field according to one embodiment is as follows:

```
[
  {
    "resolutionBwHz": 6e6,
    "profiles":[
      [
        {"hz": 5.18e8, "dbm": 30.0, "is_cc":TRUE},
        {"hz":5.30e8, "dbm": 30.0, "is_cc":FALSE}
      ],
      ...
    ]
  }
]
```

The "Spectrum_Use_Notify" message of the PAWS protocol is a notification message used by a device to indicate the spectrum anticipated to be used by the device. The "spectra(profile:list" field is used to specify profiles of frequencies and corresponding power levels. The power levels refer to permissible power spectral density over a resolution bandwidth in hertz indicated by the "resolutionBwHz" field shown as 6 MHz in the above example. The "profiles" portion specifies permissible power levels for each frequency of a list of frequencies. The "is_cc" flag is set to TRUE to indicate that master WSD 102 has determined that the particular frequency is used as a control channel by master WSD 102. The "is_cc" flag is set to FALSE to indicate that master WSD 102 has determined that the particular frequency may not be used as a control channel by master WSD 102. In the particular example above, a 518 MHz frequency is designated as a control channel by the "is_cc" flag corresponding to the channel being set to TRUE, and a 530 MHz frequency is not designated as a control channel by the "is_cc" flag corresponding to the channel being set as FALSE. Upon receiving the notification message, GDB 106 marks each frequency within the list of frequencies having a corresponding flag set to TRUE as a control channel within its database.

Figure 5A:
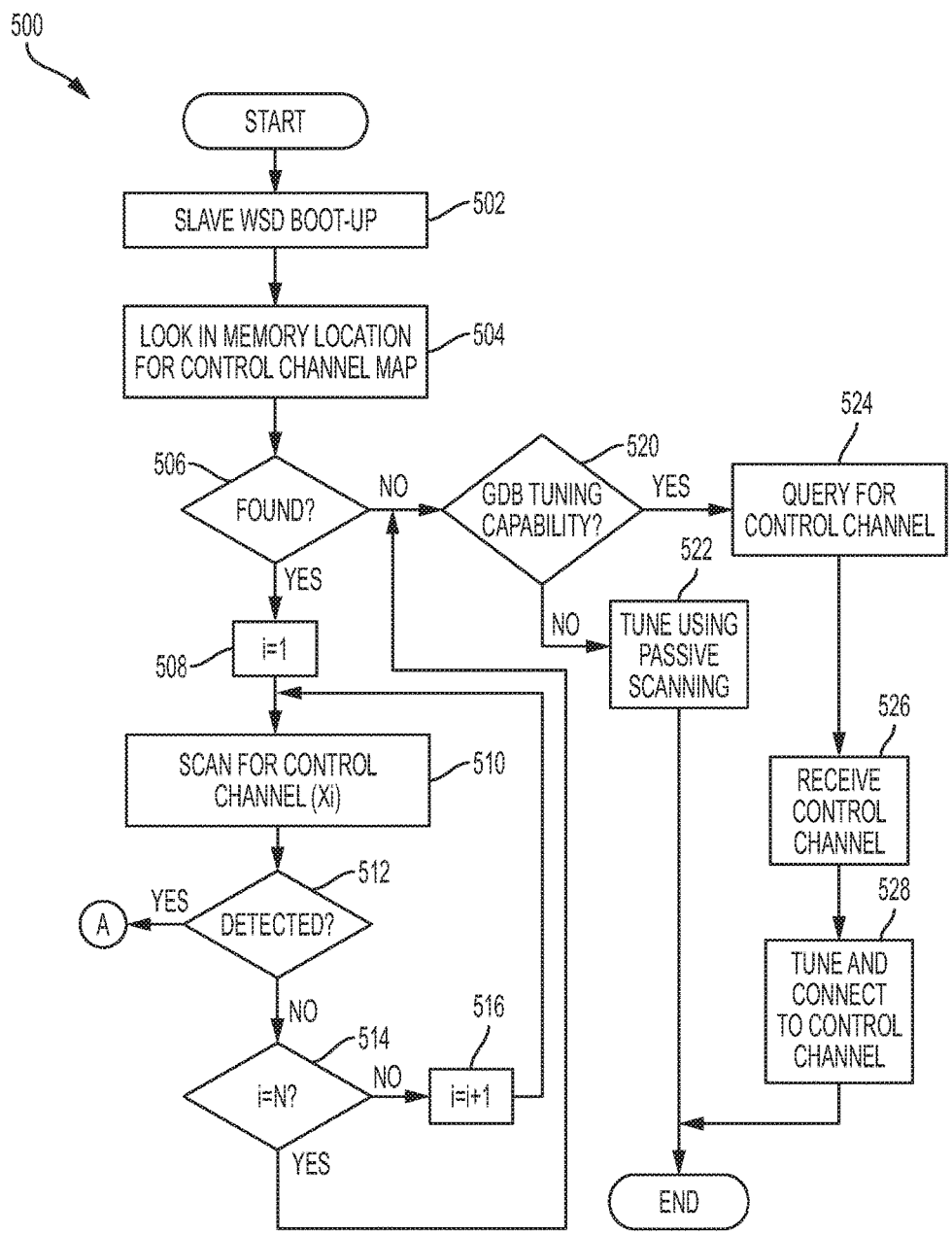
FIGS. 5A-5B are a simplified flow diagram illustrating other example operations that may be associated with embodiments of the communication system.
Figure 5B:
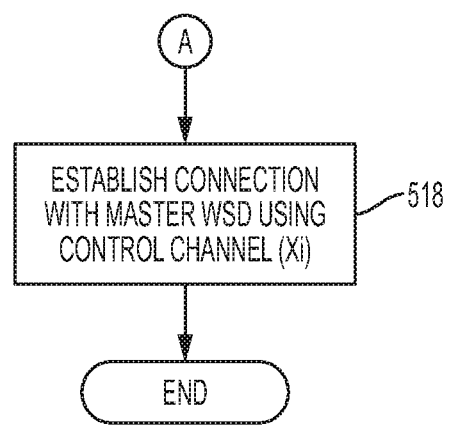

Referring now to FIGS. 5A-5B, FIGS. 5A-5B are a simplified flow diagram illustrating other example operations 500 that may be associated with embodiments of communication system 100. In 502, slave WSD 108 initiates a boot-up procedure. In 504, slave WSD 108 looks to a specified memory location to determine whether the control channel map is loaded. In 506, slave WSD 108 determines whether the control channel map is found in the specified memory location. If the control channel map is found, in 508, slave WSD 108 sets an index (i) for the currently scanned control channel equal to one (i=1). In 510, slave WSD 108 scans for the presence of the currently scanned control channel ($X_i$) in the control channel information to determine whether master WSD 102 is beaconing on the currently scanned control channel. In 512, slave WSD 108 determines whether the currently scanned control channel ($X_i$) is detected. If slave WSD 108 determines that the currently scanned control channel is not detected, the operations continue to 514. In 514, slave WSD 108 determines whether the current index value i=N.

If slave WSD 108 determines that the current index value i is not equal to N, the operations continue to 516. In 516, slave WSD 108 increments the index value by 1 (i=i+1) and the operations return to 510 in which slave WSD 108 scans for the next control channel ($X_i$) within the control channel information. If in 512 slave WSD 108 determine that the currently scanned control channel Xi has been detected, the operations continue to 518. In 518, slave WSD 108 establishes a connection with master WSD 102 using the currently scanned control channel and the operations end. Accordingly, slave WSD 108 can lock on to the correct control channel without having to scan the entire TVWS spectrum or any other spectrum in which master WSD 102 may be operating. In particular embodiments, once the connection has been established between slave WSD 108 and master WSD 102, any further updated control channel information can be directed exchanged between master WSD 102 and slave WSD 108 using the control channel. In one or more embodiments, if a loss of communication with master WSD 102 and/or a power outage has occurred, slave WSD 108 may retrieve the control channel information from memory and resume scanning for the control channel from master WSD 102. If in 506, slave WSD 108 determines that the control channel map is not found in the specific memory location or if in 514 slave WSD 108 determines that the current index value i is equal to N (i=N), the operations continue to 520 in which slave WSD 108 determines whether it has the capability to tune to and/or contact GDB 106. If slave WSD 108 does not have the capability to tune to and/or contact GDB 106, in 522 slave WSD 108 begins passive scanning to tune to the control channel and operations end.

In 506, if the control map is not found in the specified memory location and slave WSD 108 has the capability to tune to and/or contact GDB 106, in 524 slave WSD 108 sends a query to GDB 106 for control channel information including one or more control channels that master WSD 102 has informed GDB 106 are available for use in the location associated with slave WSD 108. In at least one embodiment, the query from slave WSD 108 to GDB 106 uses a new message structure conforming to the PAW protocol designated as a "GET_AVAILABLE_CONTROL_CHANNEL_INFO_REQ" query message which includes a geolocation parameter (e.g., latitude and longitude) indicative of a location of slave WSD 102 and a device descriptor identifying master WSD 108. An example message structure of the "GET_AVAILABLE_CONTROL_CHANNEL_INFO_REQ" query message according to one embodiment is as follows:

GET_AVAILABLE_CONTROL CHANNEL_INFO_REQ
  Geolocation Parameter:
    Latitude:float [REQUIRED]
    Longitiude:float [REQUIRED]
  Device Descriptor
    serialNumber:string [REQUIRED]
    manufacturerId:string [REQUIRED]
    modelID:string [REQUIRED]
    rulesetIds:list [OPTIONAL]
  MASTER_BSSID:string [REQUIRED]

The Latitude and Longitude fields of the Geolocation parameter include a floating point representation of the latitude and longitude, respectively, of slave WSD 102. The serialNumber, manufactureId, and modelID fields include a string representation of the serial number, manufacturer identifier, model identifier, respectively, of slave WSD 102. A ruleset represents a series of rules that governs the operation of whitespace devices and spectrum databases. The rulesetIds field may optionally be used to include a list of one or more ruleset identifiers to indicate support for a ruleset. The MASTER_BSSID is a string representation of the basic service set identification (BSSID) of master WSD 102.

In 526, slave WSD 108 receives a response message including the control channel information from GDB 106 having N (N={0, 1, 2 ... n}) control channels of the master WSDs serving in that geolocation. In at least one embodiment, GDB 106 sends a new message structure conforming to the PAWS protocol designated as a "GET_AVAILABLE_CONTROL_CHANNEL_INFO_RESP" response message which includes an indication of the control channel information associated with master WSD 102. An example message structure of the "GET_AVAILABLE_CONTROL_CHANNEL_INFO_RESP" response message according to one embodiment is as follows:

GET_AVAILABLE_CONTROL CHANNEL_INFO_RESP
  Spectra:list (loop)
    Geolocation Parameter:
      Latitude:float [REQUIRED]
      Longitiude:float [REQUIRED]
      Frequency:string [REQUIRED]

The spectra portion includes a list of control channel frequencies of the one or more master WSD 102 operating in same or nearby geolocation determined by GDB 106. Each control channel frequency designation includes geolocation parameters include a floating point representation of the latitude and longitude, respectively, of master WSD 102 and a string representation of the control channel frequency. In 528, slave WSD tune and connects to the control channel indicated by the control channel information and the operations end.

In 508, slave WSD 108 stores the control channel information in memory element(s) 304. Various embodiments described herein may provide one or more of the following advantages: (1) reducing the time taken for a slave WSD to scan for a control channel; (2) reducing the complexity of spectrum scanning hardware and/or software within the WSD; (3) providing faster network access setup to clients of a slave WSD; (4) enabling a mobile slave WSD to quickly locate a new master WSD and corresponding control channel when it moves into a different coverage area; and (5) making the deployment of a slave WSD easier.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, master WSD 102, GDB 106, and slave WSD 108. In some embodiments, one or more of these features may be implemented in hardware, provided external to these elements, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, master WSD 102, GDB 106, and slave WSD 108 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element comprised in master WSD 102, GDB 106, and slave WSD 108) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processor comprised in master WSD 102, GDB 106, and slave WSD 108) could transform an element or an article (e.g., data, or electrical signals) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 100 has been illustrated with reference to particular elements and operations that facilitate the communication process, these elements, and operations may be replaced by any suitable architecture or process that achieves the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. An apparatus, comprising:
a processor; and
a memory in communication with the processor, the processor configured to:
send, by a first device, a request for a whitespace map, the whitespace map including a list of whitespace frequency channels available for use within a particular geographical area;
receive the whitespace map by the first device;
using, by the first device, a probability algorithm for determining a control channel map from the whitespace map, wherein the probability algorithm selects a subset of the whitespace frequency channels to form a list of potential control channel frequencies based on the whitespace frequency channels that appear most frequently in a predetermined sampling interval; and
arranging the list of control channel frequencies of the control channel map in descending order of probability value associated with each control channel frequency.

2. The apparatus of claim 1, wherein the first device includes a master whitespace device.

3. The apparatus of claim 1, wherein a probability value of a particular whitespace frequency channel is based upon a number of appearances of the particular whitespace frequency channel in the predetermined sampling interval and a number of whitespace map samples within the predetermined sampling interval.

4. The apparatus of claim 3, wherein the probability value of the particular whitespace frequency channel is equal to the number of appearances of the particular whitespace frequency channel in the predetermined sampling interval divided by the number of whitespace map samples within the predetermined sampling interval.

5. The apparatus of claim 1, wherein the probability algorithm is further based upon transmit power restrictions of each of the whitespace frequency channels.

6. An apparatus, comprising:
a processor; and
a memory in communication with the processor, the processor configured to:
send, by a first device, a request for a whitespace map, the whitespace map including a list of whitespace frequency channels available for use within a particular geographical area;
receive the whitespace map by the first device;
determine, by the first device, a control channel map from the whitespace map using a probability algorithm, the control channel map being a subset of the whitespace map and including a list of potential control channel frequencies; and
send, by the first device, the determined control channel map to a second device,
wherein a third device is configured to send a query message for the control channel map to the second device, and receive a response message including the control channel map.

7. The apparatus of claim 6, wherein the control channel map is included in a notification message that includes a list of one or more whitespace frequencies, each of the one or more whitespace frequencies including an indication of whether the whitespace frequency is available as a control channel.

8. The apparatus of claim 7, wherein the indication of whether the whitespace frequency is available as a control channel includes a Boolean flag.

9. The apparatus of claim 6, wherein the third device is further configured to:
scan for a control channel beacon transmitted by the first device using the control channel map.

10. The apparatus of claim 6, wherein the third device includes a slave whitespace device.

11. A method executed at a first device in a wireless network, the method comprising:
sending a request for a whitespace map, the whitespace map including a list of whitespace frequency channels available for use within a particular geographical area;
receiving the whitespace map;
determining a control channel map from the whitespace map using a probability algorithm, the control channel map being a subset of the whitespace map and including a list of potential control channel frequencies, wherein the probability algorithm is based upon the most frequently appearing whitespace frequency channels in a predetermined sampling interval, and wherein a probability value of a particular whitespace frequency channel is based upon a number of appearances of the particular whitespace frequency channel in the predetermined sampling interval and a number of whitespace map samples within the predetermined sampling interval; and
sending the determined control channel map to a second device.

12. The method of claim 11, further comprising arranging the list of control channel frequencies of the control channel map in descending order of probability value associated with each control channel frequency.

13. The method of claim 11, wherein the probability algorithm is further based upon transmit power restrictions of each of the whitespace frequency channels.

14. The method of claim 11, wherein the control channel map is included in a notification message that includes a list of one or more whitespace frequencies, each of the one or more whitespace frequencies including an indication of whether the whitespace frequency is available as a control channel.

15. The method of claim 14, wherein a third device is configured to send a query message for the control channel map to the second device, receive a response message including the control channel map, and scan for a control channel beacon transmitted by the first device using the control channel map.

16. Non-transitory tangible computer-readable media that includes instructions for execution, which when executed by a processor, is operable to perform operations comprising:
sending, by a first device, a request for a whitespace map, the whitespace map including a list of whitespace frequency channels available for use within a particular geographical area;
receiving the whitespace map by the first device; and
determining, by the first device, a control channel map from the whitespace map using a probability algorithm, the control channel map being a subset of the whitespace map and including a list of potential control channel frequencies wherein the control channel map is included in a notification message that includes a list of one or more whitespace frequencies, each of the one or more whitespace frequencies including an indication of whether the whitespace frequency is available as a control channel; and
sending, by the first device, the determined control channel map to a second device.

17. The media of claim 16, wherein a probability value of a particular whitespace frequency channel is based upon a number of appearances of the particular whitespace frequency channel in a predetermined sampling interval and a number of whitespace map samples within a predetermined sampling interval.

18. The media of claim 17, wherein the processor is further operable for arranging the list of control channel frequencies of the control channel map in descending order of probability value associated with each control channel frequency.

19. The media of claim 16, wherein the processor is further operable for sending a notification message indicative of the determined control channel map to a second device.

* * * * *